UNITED STATES PATENT OFFICE.

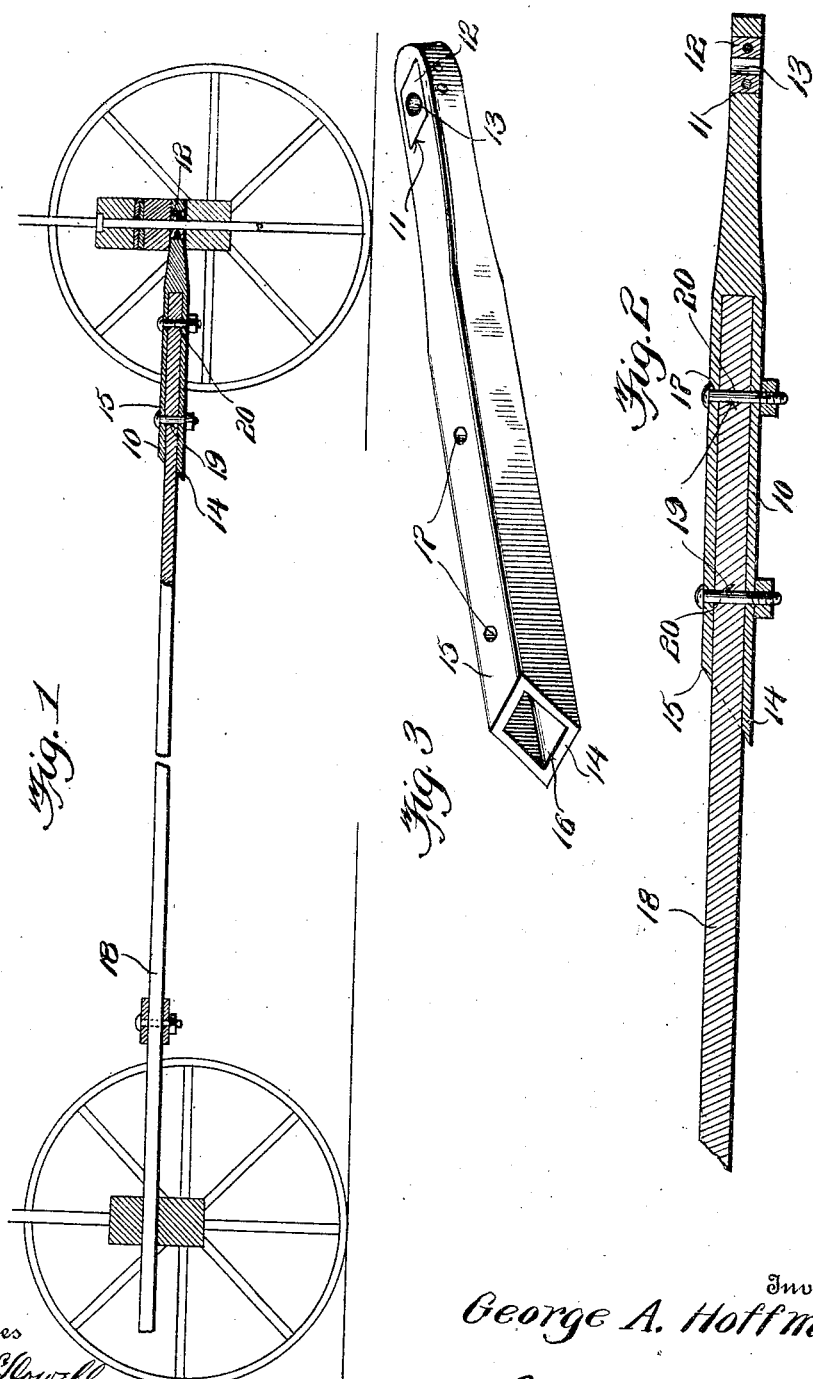

GEORGE A. HOFFMAN, OF MAEYSTOWN, ILLINOIS.

COUPLING POLE AND SOCKET.

1,000,171.  Specification of Letters Patent.  Patented Aug. 8, 1911.

Application filed May 5, 1911. Serial No. 625,249.

*To all whom it may concern:*

Be it known that I, GEORGE A. HOFFMAN, a citizen of the United States, residing at Maeystown, in the county of Monroe and State of Illinois, have invented new and useful Improvements in Coupling Poles and Sockets, of which the following is a specification.

An object of the invention is to provide a device in which the wagon pole can be conveniently connected to the socket thereof and adjustably mounted relatively thereto.

For the purpose mentioned, use is made of a socket having pivotal connection with the frame of a vehicle, the base of the socket being extended outwardly at one end a distance beyond the upper portion thereof and a vehicle pole having one end for disposal in the said socket, the said tongue being adjustably mounted relatively to the socket.

Reference is to be had to the accompanying drawings constituting a part of this specification, in which similar characters of reference denote corresponding parts in all the views, and in which—

Figure 1 is a sectional view of a vehicle and showing my device applied thereto. Fig. 2 is a horizontal sectional view through my device. Fig. 3 is a plan view of the socket and pole, the pole being disconnected from the said socket.

Referring more particularly to the views I provide a socket 10 having an aperture 11 at one end thereof and in which is fitted a bearing block 12 having an aperture 13 therein, the said bearing block being preferably constructed of wood or a similar material while the socket 10 is constructed of metal so that a suitable bearing surface is provided for a bolt connected to the front of a vehicle and passing through the aperture 13 in the bearing block 12 to connect the socket 10 to the vehicle. The other end of the socket 10 is open and has the base 14 thereof extended outwardly a distance beyond the upper portion 15 of the socket so that the extension of the base 14 will constitute a bearing member or platform 16. The socket 10 is provided with a series of apertures 17 disposed centrally relatively to the longitudinal axis of the socket and extending through both the top and bottom sides of the socket. A pole 18 is adapted to be inserted in the open end of the socket 10 and is provided with spaced apertures 19 extending vertically therethrough, the said apertures 19 being adapted to register with the apertures 17 so that a pin 20 can be disposed in one of the apertures 17 in the socket 10 and one of the apertures 19 in the pole 18 to retain the pole 18 in position relatively to the socket 10, it being readily seen that by removing the pin 20 and disposing the same in different registering apertures of both the socket and the pole, the said pole can be adjusted relatively to the socket. By providing the platform or base extension 16 the pole can be more easily inserted in the socket 10 as the mentioned extension 16 acts as a guide for the pole as will be seen by referring to the figures.

Having thus fully described the invention, what I claim as new, is:—

In combination in the running gear, a socket for the reach having an open end and provided with a plurality of transversely extending apertures, the said socket having an opening adjacent the closed end thereof, an apertured block disposed in the opening in the closed end of the socket, the said block being adapted to receive a bolt therethrough for connecting the socket to a vehicle frame and the said socket having the base thereof at the open end extended outwardly beyond the top side of the said socket, a pole provided with a plurality of transversely extending apertures and adapted to be slidably received in the said socket and a pin disposed to pass through one of the apertures of the said pole to retain the said pole in engagement with the said socket.

In testimony whereof I affix my signature in presence of two witnesses.

GEORGE A. HOFFMAN.

Witnesses:
 GUS. P. JOBB,
 HENRY WILD.

---

Copies of this patent may be obtained for five cents each, by addressing the "Commissioner of Patents, Washington, D. C."